United States Patent
Kapoor et al.

(10) Patent No.: US 10,268,943 B2
(45) Date of Patent: Apr. 23, 2019

(54) INLAY DESIGNS FOR UHF RFID TAGS

(71) Applicant: APK IDENTIFICATION, Noida (IN)

(72) Inventors: Puneet Kapoor, Noida (IN); Alok Kapoor, Noida (IN)

(73) Assignee: APK IDENTIFICATION, Noida (IN)

( * ) Notice: Subject to any disclaimer, the term of this patent is extended or adjusted under 35 U.S.C. 154(b) by 18 days.

(21) Appl. No.: 15/742,258

(22) PCT Filed: Jul. 6, 2016

(86) PCT No.: PCT/IN2016/050223
§ 371 (c)(1),
(2) Date: Jan. 5, 2018

(87) PCT Pub. No.: WO2017/006350
PCT Pub. Date: Jan. 12, 2017

(65) Prior Publication Data
US 2018/0197063 A1 Jul. 12, 2018

(30) Foreign Application Priority Data

Jul. 7, 2015 (IN) .......................... 2060/DEL/2015
Jul. 7, 2015 (IN) .......................... 2061/DEL/2015

(51) Int. Cl.
*G06K 19/06* (2006.01)
*G06K 19/077* (2006.01)
*H01Q 1/22* (2006.01)
*H01Q 7/00* (2006.01)

(52) U.S. Cl.
CPC . *G06K 19/07749* (2013.01); *G06K 19/07786* (2013.01); *H01Q 1/2225* (2013.01); *H01Q 7/00* (2013.01)

(58) Field of Classification Search
CPC ....... G06K 19/07749; G06K 19/07779; G06K 19/07781; G06K 19/07786
See application file for complete search history.

(56) References Cited

U.S. PATENT DOCUMENTS 8,091,208 B2    1/2012  Finn
8,833,664 B2 *  9/2014  Choi ................ G06K 19/07327
                                                      235/487

FOREIGN PATENT DOCUMENTS

WO       2009089580 A1    7/2009

OTHER PUBLICATIONS

International Search Report for PCT/IN2016/050223, dated Dec. 16, 2016.
Written Opinion for PCT/IN2016/050223, dated Dec. 16, 2016.

* cited by examiner

*Primary Examiner* — Thien M Le
*Assistant Examiner* — April Taylor
(74) *Attorney, Agent, or Firm* — Mark M. Friedman

(57) ABSTRACT

The present specification describes an ultra-high frequency (UHF) radio frequency identification (RFID) device, having a wire inlay bonded with a plastic material; and, an electronic integrated circuit attached thereto. The wire inlay is formed by looping and embedding the wire in a predefined circular design on a substrate. The UHF RFID device operates within frequencies ranging from 840 MHz to 960 MHz. The electronic integrated circuit comprises a transponder chip operating at frequencies ranging from 840 MHz to 960 MHz; and the transponder chip is a Class 1 Generation 2 UHF RFID transponder chip.

16 Claims, 4 Drawing Sheets

INLAY DESIGNS FOR UHF RFID TAGS

CROSS REFERENCE TO RELATED APPLICATIONS

This application is a U.S. National Phase filing under 35 U.S.C. § 371 of International Application PCT/IN2016/050223, filed Jul. 6, 2016, and published as WO 2017/006350 A1 on Jan. 12, 2017. PCT/IN2016/050223 claims priority from Indian application numbers 2060/DEL/2015, filed Jul. 7, 2015, and 2061/DEL/2015, filed Jul. 7, 2015. The entire contents of each of these prior applications are hereby incorporated herein by reference.

FIELD

The present specification relates generally to identification tags using Radio Frequency identification (RFID) technology. More specifically the present specification relates to creation of a round ultra-high frequency (UHF) wire inlay for use in RFID tags.

BACKGROUND

RFID systems which as such were being used in wide range of applications such as retail supply chain, postal logistics, healthcare, manufacturing etc., have now also been put to the sector of animal/livestock management (include industrial purposes and asset tracking). In the animal/livestock management sector, the RFID system is used to facilitate the identification and tracking of animals that need to be reliably monitored and/or controlled with in a particular environment.

The introduction of RFID into these applications has resulted in a more secure, efficient and accurate system of the management of the animals/live stock. The objective of using these systems is to trace and track every individual animal from birth to the slaughter house (or as per the requirements from a particular animal, for example, cow in a milk farm for extraction of milk) with its individual information (for example personal identification number, birth, vaccination etc).

An enabled RFID UHF animal tag is a technology whereby a UHF inlay has been embedded into a standard animal tag. RFID is contact less technology, which uses air interface (electromagnetic waves) to communicate with the environment. Several common frequencies (LF, HF, UHF) are used worldwide, and depending on the application the appropriate frequency is chosen. This is because LF, HF and UHF have their own strengths and weaknesses. Generally the standard technology used for animal ear tag systems is LF. The inlays used in the UHF RFID animal ear tags until now were either machine inlays, printed inlays or etched inlay which as such have a restricted read range.

Hence, there is a need in the art for UHF RFID tags having an improved read range without compromising on the accuracy of the signals being read.

SUMMARY

In an embodiment the present specification provides an ultra-high frequency (UHF) radio frequency identification (RFID) device, comprising: a wire inlay bonded with a plastic material; and, an electronic integrated circuit attached thereto. In an embodiment, the wire inlay is formed by looping and embedding the wire in a predefined circular design on a substrate.

In an embodiment, the UHF RFID device operates within frequencies ranging from 840 MHz to 960 MHz. In an embodiment, the electronic integrated circuit comprises a transponder chip operating at frequencies ranging from 840 MHz to 960 MHz. In an embodiment, the transponder chip is a Class 1 Generation 2 UHF RFID transponder chip.

In an embodiment, the UHF RFID device further comprises an antenna coupled with an Interrogator for powering the transponder chip. In an embodiment, the substrate is made of one of polyvinyl chloride (PVC), PC, and Polyethylene terephthalate Cdycoi (PETG).

In an embodiment, the circular design comprises a first portion comprising one or more semi-circular loops of wire coupled with a second identical portion comprising one or more semi-circular loops of wire; the first and the second portions being separated by a gap of predefined dimension. In an embodiment, the transponder chip is positioned within the gap between the first and the second portions of the circular design of the wire.

In an embodiment, a thickness of the wire ranges from 30 American Wire Gauge (AWG) to 42 AWG; and an outer diameter of the circular design ranges from 22 mm to 30 mm and an inner diameter of the circular design ranges from 8 mm to 16 mm In an embodiment, the plastic material is Polyvinyl chloride (PVC).

In another embodiment the present specification provides an ultra-high frequency (UHF) radio frequency identification (RFID) device, comprising: a wire inlay bonded with a plastic material; and, an electronic integrated circuit attached thereto, the device being placed within to form a UHF RFID tag. In an embodiment, the tag comprises two halves opening to receive the device, the two halves being sealed to form the UHF RFID tag; and the tag is made of a plastic or thermoplastic material.

The aforementioned and other embodiments of the present shall be described in greater depth in the drawings and detailed description provided below.

BRIEF DESCRIPTION OF THE DRAWINGS

These and other features and advantages of the present invention will be appreciated, as they become better understood by reference to the following detailed description when considered in connection with the accompanying drawings, wherein.

DETAILED DESCRIPTION

Figure 1A:
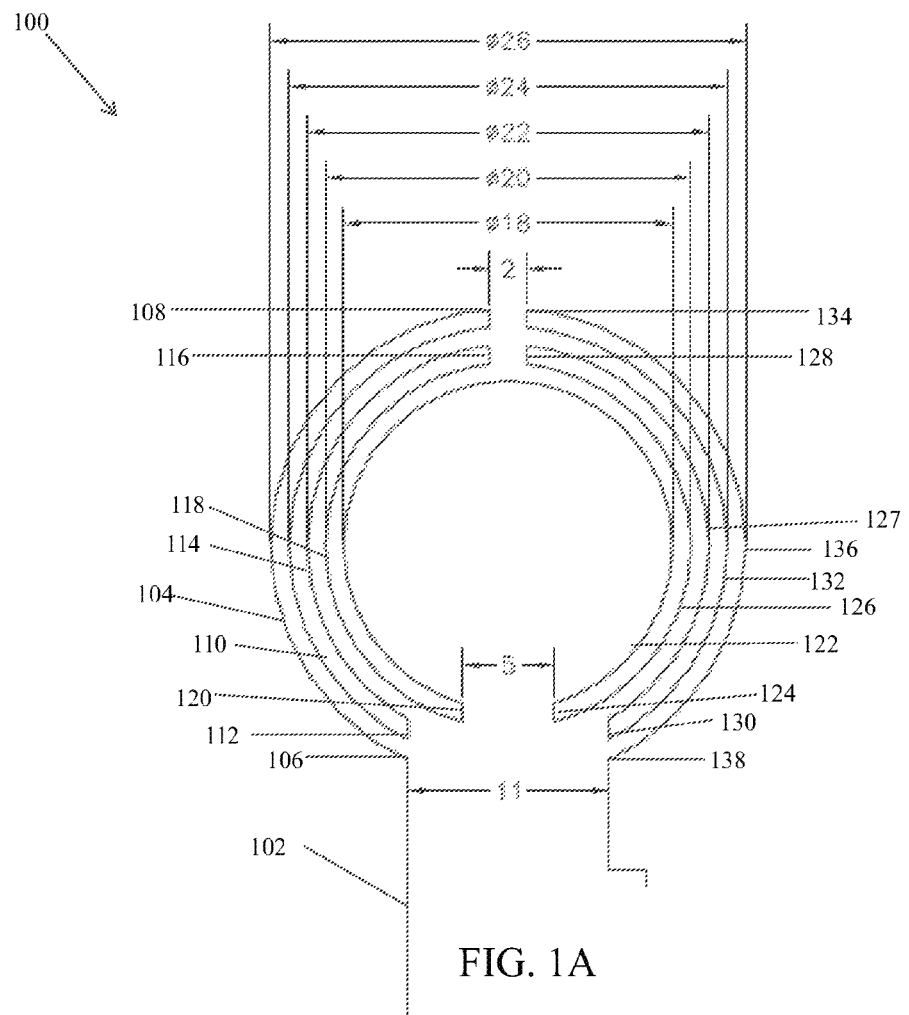
FIG. 1A illustrates a circular inlay design for a UHF RFID tag, in accordance with an embodiment of the present specification.

The present specification provides a wire inlay for use in UHF RFID tags as opposed to a machine (printed) inlay being used in currently available UHF RFID tags. In various embodiments, wires (wire inlay) are embedded on a substrate in a predefined circular design by using mechanical processes. The embedded wires are connected to a transponder/chip resulting in a much extended read range as compared to the prior art RFID tags. For example, in an embodiment, a wire based 30 millimeters (mm) tag provides a read range of 1.5 meters to 2.0 meters whereas a prior art RFID based 30 mm tag provided a read range of about 0.3 meters to 0.7 meters.

In an embodiment, the wire inlay is fabricated upon a substrate such as but not limited to Polyvinyl chloride (PVC), and Polyethylene terephthalate glycol (PETG). The wire is embedded in the substrate in a predefined circular design by using an embedding machine. In an embodiment, the embedded wire is connected to an EPC Class 1 Generation 2 chip, which defines the physical and logical requirements for a passive-backscatter, Interrogator (RFID Class 1 Gen 2 Reader) Talks First (ITF), RFID system operating in the 840 MHz-960 MHz frequency range. The operating power of the chip is derived from RF energy transmitted by an Interrogator coupled with an antenna of the tag. In various embodiments, this connection can be made by using known processes such as soldering, welding, and thermal compression, or by using conductive glue.

The present specification is directed towards multiple embodiments. The following disclosure is provided in order to enable a person having ordinary skill in the art to practice the invention. Language used in this specification should not be interpreted as a general disavowal of any one specific embodiment or used to limit the claims beyond the meaning of the terms used therein. The general principles defined herein may be applied to other embodiments and applications without departing from the spirit and scope of the invention. Also, the terminology and phraseology used is for the purpose of describing exemplary embodiments and should not be considered limiting. Thus, the present invention is to be accorded the widest scope encompassing numerous alternatives, modifications and equivalents consistent with the principles and features disclosed. For purpose of clarity, details relating to technical material that is known in the technical fields related to the invention have not been described in detail so as not to unnecessarily obscure the present invention. In the description and claims of the application, each of the words "comprise" "include" and "have", and forms thereof, are not necessarily limited to members in a list with which the words may be associated.

As used herein, the indefinite articles "a" and "an" mean "at least one" or "one or more" unless the context clearly dictates otherwise.

FIG. 1 illustrates a circular inlay design for a UHF RFID tag, in accordance with an embodiment of the present specification. In various embodiments, a wire 102 may be embedded in a substrate such PVC, PETG, etc. to obtain an inlay for a UHF RFID tag. In an embodiment, wire 102 may be embedded in a PVC sheet having thickness ranging from 0.1 to 0.3 mm.

As shown in FIG. 1A wire 102 is looped in a first partial circle 104 starting at a first proximal end 106 to a first distal end 108 and then turned into in a second partial circle 110 starting from the first distal end 108 to a second proximal end 112 which is separated from the first proximal end 106 by a distance of approximately 2 mm Wire 102 is next looped into a third partial circle 114 starting from the second proximal end 112 to a second distal end 116 and then into a fourth partial circle 118 staring from the second distal end 116 to a third proximal end 120, wherein the third proximal end is separated from the second proximal end by a distance of approximately 2 mm and the second distal end is separated from the first distal end by a distance of approximately 2 mm.

Wire 102 is next looped into a circular loop 122 all the way from the third proximal end 120 to a fourth proximal end 124. In an embodiment, the distance separating the third proximal 120 end and the fourth proximal end 124 is approximately 5 mm as shown in the figure; and the diameter of the circular loop 122 is approximately 18 mm Wire 102 is next looped into a fifth partial circle 126 starting from the fourth proximal end 124 to a third distal end 128, wherein the third distal end 128 is separated from the second distal end by a distance of approximately 2 mm Wire 102 is next looped into a sixth partial circle 127 starting from the third distal end 128 to a fifth proximal end 130, wherein the fifth proximal end 130 is separated from the fourth proximal end 124 by a distance of approximately 2 mm Wire 102 is next looped into a seventh partial circle 132 starting from the fifth proximal end 130 to a fourth distal end 134; and then into an eighth partial circle 136 starting from the fourth distal end 134 to a sixth proximal end 138, wherein the fourth distal end 134 is separated from the third distal end 128 by a distance of approximately 2 mm; and the fifth proximal end 130 is separated from the sixth proximal end 138 by a distance of approximately 2 mm.

In an embodiment, the sixth proximal end 138 is separated from the first proximal end 106 by a distance of approximately 11 mm Further, the distance between the first and fourth distal ends and second and third distal ends respectively is approximately 2 mm Also, in an embodiment, the diameter of a partial circle formed by the fourth loop 118 and the fifth loop 126 is approximately 20 mm; the diameter of a partial circle formed by the third loop 114 and the sixth loop 127 is approximately 22 mm; the diameter of a partial circle formed by the second loop 110 and the seventh loop 132 is approximately 24 mm; and the diameter of a partial circle formed by the first loop 104 and the eight loop 136 is approximately 26 mm.

Figure 1B:
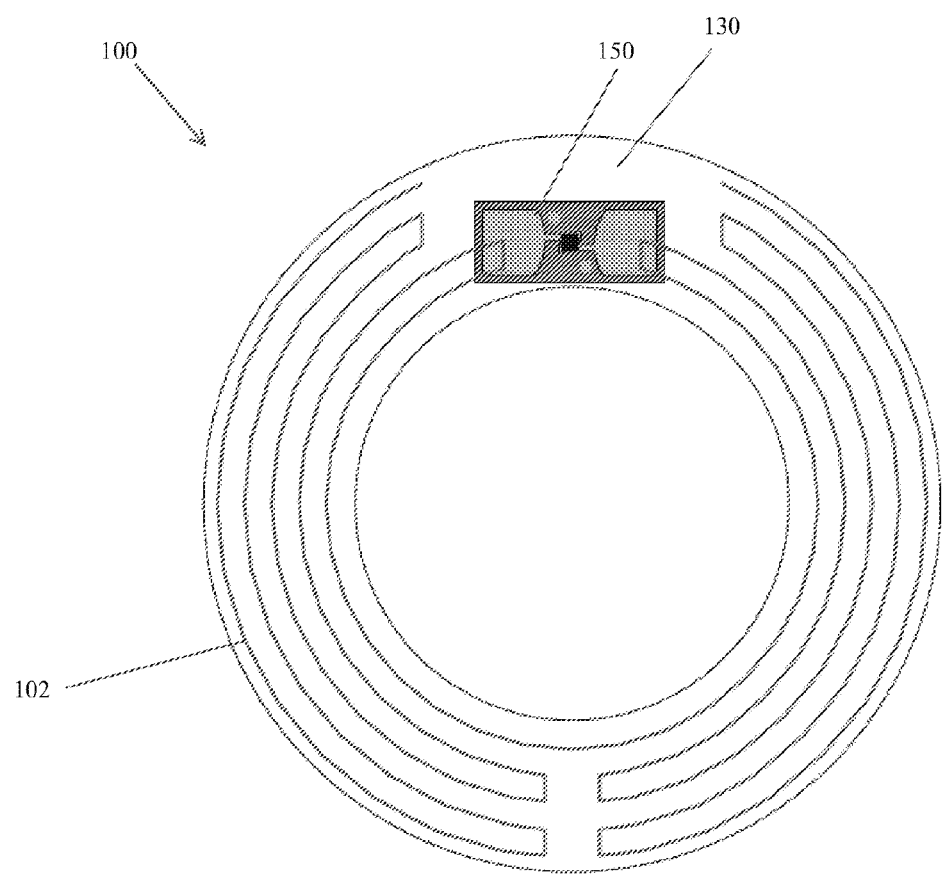
FIG. 1B illustrates a UHF transponder/chip fitted in a gap in the circular inlay design of the UHF RFID tag in accordance with an embodiment of the present specification.

FIG. 1B illustrates a UHF transponder/chip fitted in a gap in the circular loop structure of wire, in accordance with an embodiment of the present specification. In various embodiments a UHF transponder/chip 150 is fitted in the gap 152 between the third proximal end 120 and the fourth proximal end 124 and is coupled with the wire 102. In an embodiment, an EPC Class 1 Generation 2 chip 840 MHz-960 MHz frequency range is fitted in the gap 152 coupled with wire 102.

Figure 1C:
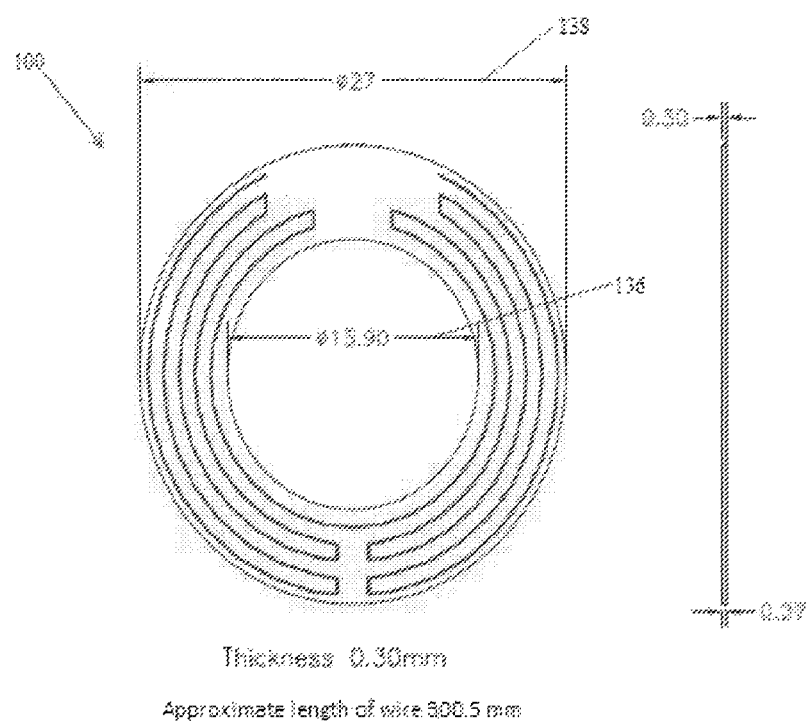
FIG. 1C illustrates wire specifications for an inlay design of a UHF RFID tag, in accordance with an embodiment of the present specification.

FIG. 1C illustrates substrate specifications for an inlay design of a UHF RFID tag, in accordance with an embodiment of the present specification. In an embodiment, thickness of the substrate 130 ranges from 0.10 to 0.30 mm. In an embodiment, an inner diameter 136 of inlay design 100 measures 15.90 mm, while an outer diameter 138 measures 27 mm, as shown in FIG. 1C. Also, in an embodiment, the total length of wire used in the inlay design 100 is approximately 300.5 mm.

In an embodiment, the wire inlay design as shown in FIG. 1A has an outer diameter of 27 mm and an inner punch of 16 mm and is extracted from the substrate which results in the inlay having the structure of a ring. The inlay is thereafter pasted with a polyester grade circular ring from one side to protect the inlay ring. Next, the inlay ring along with the protective coating is treated with an outer and an inner punch. This gives the UHF inlay with wire embedding strength, and is thereafter placed into plastic for use as animal ear tag.

Figure 2:
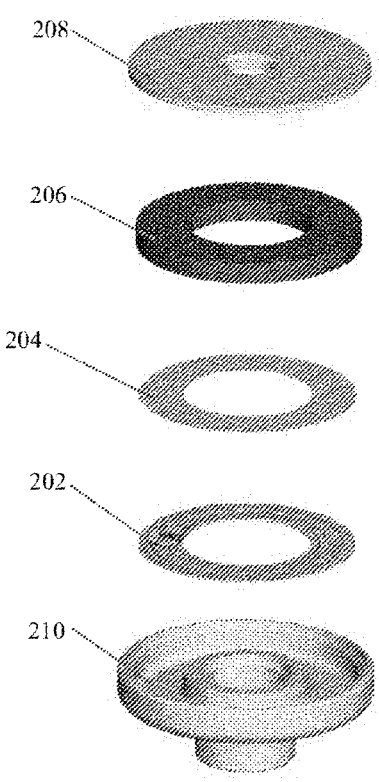
FIG. 2 illustrates the stages of employing a UHF wire inlay into an RFID tag, in accordance with an embodiment of the present specification.

FIG. 2 illustrates the stages of employing a UHF wire inlay into an RFID tag. The UHF inlay is in the form of a circular ring 202 after being extracted from the substrate. Circular inlay 202 is bonded with a protective ring 204, covering the looped wire and the transponder chip. In an embodiment, the protective ring is made of a flexible polymer based material such as but not limited to polyester, vinyl and Polypropylene (PP). Next, the protective ring 204 is bonded with a ring 206 made of any filler material such as but not limited to Epoxy (1 part or 2 part), or any adhesive filling material to further strengthen the wire inlay 202. Next, the strengthened ring structure is placed within a tag made of a plastic material. The tag comprises two halves—a cover portion 208 and a base portion 210 made of a thermoplastic material. The strengthened inlay ring is placed between the cover 208 and the base 210 and then the two halves are sealed together to form a UHF RFID tag which may be pinned on an animal ear or put to any other suitable use.

It is submitted that the length, the gap in between and the number of turns of the wire in the tag may vary depending upon the needs to tune the desired frequency. Accordingly, the above examples are merely illustrative of the many applications of the system of present invention. Although only a few embodiments of the present invention have been described herein, it should be understood that the present invention might be embodied in many other specific forms without departing from the spirit or scope of the invention. Therefore, the present examples and embodiments are to be considered as illustrative and not restrictive, and the invention may be modified within the scope of the appended claims.

We claim:

1. An ultra-high frequency (UHF) radio frequency identification (RFID) device, comprising:
   a wire inlay made of copper or aluminum or any metal bonded with a plastic material, the wire inlay formed by looping and embedding the wire in a predefined circular design on a substrate, the circular design comprising:
      a first portion comprising a plurality of semi-circular concentric first partial circles,
      an opposing second portion coupled to the first portion, the second portion comprising an equal plurality of semi-circular concentric second partial circles,
      wherein the first and second portions are separated by a gap of predefined dimension; and,
   an electronic integrated circuit attached thereto.

2. The UHF RFID device of claim 1 operating within frequencies ranging from 840 MHz to 960 MHz.

3. The UHF RFID device of claim 1 wherein the electronic integrated circuit comprises a transponder chip operating at frequencies ranging from 840 MHz to 960 MHz.

4. The UHF RFID device of claim 3 wherein the transponder chip is a Class 1 Generation 2 UHF RFID transponder chip.

5. The UHF RFID device of claim 1 further comprising an antenna coupled with an Interrogator for powering a transponder chip.

6. The UHF RFID device of claim 1; wherein the substrate is made of one of PVC, PC, and PETG.

7. The UHF RFID device of claim 1 wherein the integrated circuit comprises a transponder chip, wherein the transponder chip is positioned within the gap between the first and the second portions of the circular design of the wire.

8. The UHF RFID device of claim 1 wherein a thickness of the wire ranges from 30 AWG to 42 AWG.

9. The UHF RFID device of claim 1 wherein an outer diameter of the circular design ranges from 22 mm to 27 mm and an inner diameter of the circular design ranges from 8 mm to 16 mm.

10. The UHF RFID device of claim 1 wherein the plastic material is Polyvinyl chloride (PVC).

11. An ultra-high frequency (UHF) radio frequency identification (RFID) device, comprising: a wire inlay bonded with a plastic material, the wire inlay forming a circular design on the plastic material, the circular design comprising:
   a first portion comprising a plurality of semi-circular concentric first partial circles,
   an opposing second portion coupled to the first portion, the second portion comprising an equal plurality of semi-circular concentric second partial circles,
   wherein the first and second portions define a predetermined gap therebetween; and,
   an electronic integrated circuit attached thereto, the device being placed within a tag to form a UHF RFID tag.

12. The UHF RFID device of claim 11 wherein the tag comprises two halves opening to receive the device, the two halves being sealed to form the UHF RFID tag.

13. The UHF RFID device of claim 11 wherein the tag is made of a plastic/thermoplastic material.

14. The UHF RFID device of claim 1, wherein:
   within the first portion, each first partial circle is coupled to an adjacent first partial circle at one of a proximal end and a distal end of the coupled first partial circles; and
   within the second portion, each second partial circle is coupled to an adjacent second partial circle at one of a proximal end and a distal end of the coupled second partial circles.

15. The UHF RFID device of claim 1, wherein:
   the first and second portions are coupled together solely by a single circular loop of wire, the circular loop being concentric to the first and second partial circles and having a smaller diameter than any partial circle.

16. The UHF RFID device of claim 15, wherein:
   the integrated circuit comprises a transponder chip, the transponder chip positioned within the gap and connected to opposing distal ends of the circular loop.

* * * * *